United States Patent [19]

Palecek, deceased et al.

[11] Patent Number: 5,390,269
[45] Date of Patent: Feb. 14, 1995

[54] FIBER OPTIC CONNECTOR WITH HIGH RESOLUTION TUNABLE FIBER HOLDER

[75] Inventors: Vincent J. Palecek, deceased, late of Brookfield, by Patricia A. Palacek, legal represenative; Philip W. Schofield, Oak Park, both of Ill.

[73] Assignee: Methode Electronics, Inc., Chicago, Ill.

[21] Appl. No.: 995,884

[22] Filed: Dec. 23, 1992

[51] Int. Cl.[6] .................................. G02B 6/36
[52] U.S. Cl. ............................. 385/78; 385/72; 385/76
[58] Field of Search .............. 385/76, 72, 60, 78, 385/90, 104, 111

[56] References Cited

U.S. PATENT DOCUMENTS

| | | | |
|---|---|---|---|
| 4,255,015 | 3/1981 | Adams et al. | 350/96.20 |
| 4,432,602 | 2/1984 | Margolin | 350/96.20 |
| 4,738,507 | 4/1988 | Palmquist | 350/96.21 |
| 4,738,508 | 4/1988 | Palmquist | 350/96.21 |
| 4,795,229 | 1/1989 | Abendschein | 350/96.20 |
| 4,834,487 | 5/1989 | Abendschein et al. | 350/96.20 |
| 4,887,875 | 12/1987 | Chang et al. | 350/96.21 |
| 4,953,941 | 9/1990 | Takahashi | 350/96.20 |
| 5,054,879 | 10/1991 | Brown | 385/59 |
| 5,073,044 | 12/1991 | Egner et al. | 385/86 |
| 5,096,276 | 3/1992 | Gerace et al. | 385/76 |
| 5,121,455 | 6/1992 | Palecek | 385/69 |
| 5,134,677 | 7/1992 | Leung et al. | 385/84 |
| 5,136,672 | 8/1992 | Mulholland et al. | 385/53 |
| 5,146,525 | 9/1992 | Tabone . | |

FOREIGN PATENT DOCUMENTS

0330399A1  8/1989  European Pat. Off. .
4203966A1  8/1992  Germany .

*Primary Examiner*—John D. Lee
*Assistant Examiner*—Phan T. Heartney
*Attorney, Agent, or Firm*—David L. Newman

[57] ABSTRACT

An optical connector for assembly with a fiber optic cable includes a spring biased holder for an optical fiber having a rear body to prevent leaking of adhesive from the holder. A collar is provided having a multi-faceted periphery to allow insertion into a cavity of a connector body. The collar has a complementary faceted geometry in a multiplicity of orientations with respect to a mating axis to provide for high resolution tuning of the holder.

20 Claims, 2 Drawing Sheets

FIBER OPTIC CONNECTOR WITH HIGH RESOLUTION TUNABLE FIBER HOLDER

BACKGROUND OF THE INVENTION

The present invention relates to a connector for a fiber optic cable. More particularly, the invention relates to a new and improved fiber optic connector including a holder for holding a fiber optic cable and an optical fiber which provides for high resolution tuning of the holder and prevents adhesive from leaking into the shell of a fiber optic connector.

Fiber optic connectors are known which have means for preventing rotation of the fiber optic cable after positioning within a connector body during a termination procedure, such as described in U.S. Pat. No. 5,096,276 to Gerace et al. Such patents are adapted to a push-pull type connector having a plug housing including a shell, a keying position which allows the connector to remain in a fixed position upon insertion with a receptacle, and at least one reciprocating holder in the shell for holding an optical fiber. The optical fiber is connected to the reciprocating holder and is compatible within its load bearing portion with the load bearing portion anchored to the shell. The fiber is reciprocable together with the reciprocating holder and is reciprocable with respect to the shell and the load bearing portion.

It is also known to tune ferrules to provide for precise optical alignment, as shown in U.S. Pat. No. 4,738,508 to Palmquist. However, Palmquist does not teach tuning during a termination procedure. The Gerace et al. patent in particular, includes a collar having square or hexagonal profiles which prevent rotation of the holder when inserted into the shell of a connector. This invention, which has only limited positions in which the holder may be inserted into the connector, does not allow for precise concentric positioning of eccentrically manufactured ferrules and may not be precisely orientated, or tuned, to a degree sufficient to alleviate high insertion loss which occurs when a pair of abutting optical fibers are not concentric upon a common mating axis.

Increasingly, high performance connectors are required having insertion losses of less than 0.25 dB, such as angle polished ferrules and single mode applications. As a standard ferrule has a core diameter which is, for example, 128 microns and a common optical fiber diameter of 127 microns inserted therein, an optical fiber may be as much as ½ micron from the concentric axis. Further, the abutting optical fiber may also be as much as ½ micron off the concentric axis, equaling a total possible eccentricity of the optical fiber in the cores of each ferrule of 1 micron. In addition, the ferrule core may in and of itself have been manufactured off the concentric axis. Although spinning and cleaving a ferrule may make the core concentric, some ferrules such as ceramic ferrules cannot be spun and are manufactured eccentric to the mating axis. This eccentricity, if unadjusted, could possibly result in total signal loss. Thus, tuning of such fibers to optimize the position relative to the concentric axis could improve optical alignment by an order of magnitude.

Therefore, a useful device is needed in order to achieve precise tuning of the fiber during the termination procedure. Such a device is accomplished by the present invention. By this invention, a different system is provided for inserting the fiber optic cable holder into the connector in multiple orientations to allow tuning the holder for high resolution and low insertion loss.

Effective tuning may be achieved by having at least twelve different surfaces, twice as many as shown in Gerace et al., and preferably between twelve and thirty-two surfaces. The multi-faceted holder also prevents rotation of the holder within the connector body and allows for easy insertion. The present invention is well suited to single mode applications where low insertion loss and return loss are performance characteristics, which are both optimized via tuning the fiber to the concentric axis. The present invention is also well suited to ferrules which are angle polished and require complete ferrule alignment to limit insertion loss.

The Gerace et al. patent also discloses a holder having a sheath which is attached to the body of the holder through which the optical fiber and optical cable extends. Assembly of the connector involves positioning a fiber optic cable holder within a connector body. Adhesive is then deposited into the body. The adhesive may be injected by a syringe introduced into an end portion of the sheath which has been cut at an angle to provide an enlarged optical mouth. The rear of the sheath which protrudes from the end of the connector is later trimmed. The adhesive is deposited near the front end of the connector body adjacent the ferrule, distant from the rear end of the sheath. A stripped fiber optic cable is then passed through the interior cavity of a strain relief boot and through a holder including a sheath and body. The optical fiber is then securely inserted into a ferrule at the front of the cavity. The sheath prevents leaking of adhesive from the holder and prevents the adhesive from spreading into the spring and shell of the connector. Following the introduction of the adhesive into the holder, the optical fiber is pushed through the ferrule in so doing coating the optical fiber which resides within the ferrule with the adhesive, assuring the fiber is permanently bonded to the passageway through the ferrule. If strength members and external jacket accompany the optical fiber, the strength members can be secured by crimping them between the load bearing portion of the connector and a crimp sleeve. Excess fiber protruding beyond the ferrule tip is then cleaned and removed. After the adhesive has set, the ferrule tip with optical fiber is polished.

The Gerace et al. patent does not allow for manufacture of a one-piece body which prevents leaking of adhesive but is also easily installed and assembled. The present invention does not require trimming of the rear sheath, as it does not extend beyond the rear of the connector. By this invention, a different system is provided wherein the holder is a one-piece, integrally molded material including a rear body to prevent adhesive leakage, thereby avoiding adhesive on the spring which would prevent deflection of the ferrule upon mating.

By this invention, a fiber optic connector with a holder is provided which provides for high resolution tuning of the holder, is more easily inserted into a fiber optic connector, does not require assembly, does not require cutting at an angle, and has no chance of adhesive leaking into the body of the connector.

In order to overcome the deficiencies of the prior art compositions, it is an object of the present invention to provide a new and improved holder which allows concentric positioning of the fiber with respect to the common mating axis.

It is another object of the present invention to provide a new and improved holder which allows for more accurate tuning of the fiber to maximize resolution.

It is a further object of the present invention to provide a new and improved holder which is easily manufactured and assembled.

It is another object of the present invention to provide a new and improved holder which prevents the leaking of adhesive into the body of a fiber optic connector.

It is further object of the invention to avoid separation of the rear body from the holder body while tuning.

It is a another object of this invention to provide a new and improved holder which may be inserted in many positions and once inserted, prevents rotation of the holder.

SUMMARY OF THE INVENTION

In accordance with these and other objects, the present invention provides a new and improved fiber optic connector which terminates a length of fiber optic cable. The connector has a front shell and a load bearing portion and a reciprocating holder inserted in the shell. The holder holds a ferrule with an optical fiber installed therethrough. The holder includes a multi-surfaced exterior portion which allows for tuning of the holder in multiple orientations to optimize concentric positioning of the holder with respect to a common mating axis. The multi-surfaced exterior also prevents rotation of the holder relative to the shell once it is inserted into the shell.

The front shell includes a multi-surfaced interior reciprocal to the multi-surfaced exterior portion of the holder.

The multi-surfaced exterior portion of the holder is located at the outer surface of a collar which surrounds the front end of the holder. In a preferred embodiment, the multi-surfaced exterior surface of the collar is knurled, having at least twelve adjacent positions. Tuning of the holder within the front shell, which is non-rotateable with an outer grip, is achieved relative to an acknowledged industry standard orientation, such as a key positioned at the exterior of the outer grip, which locates the outer grip within a receptacle. Thus, the holder may be tuned concentric to a key.

In a further preferred embodiment, the holder includes a collar integral with the holder body. Further, the holder includes a rear body extending sufficiently from the end of the front shell to prevent adhesive from leaking into the body of the fiber optic connector. The holder may include also a collar, a body, and a rear body. A stripped fiber optic cable is inserted into the holder. The optical fiber extends into the holder and out through the rear body of the holder. The optical fiber is secured into the holder by an adhesive. If strength members and an external jacket accompany the optical fiber, the strength members can be secured by crimping them between the load bearing portion of the connector and a crimp sleeve. Excess fiber protruding beyond the ferrule tip is then cleaned and removed. After the adhesive has set, the ferrule tip with optical fiber is polished.

In accordance with the preferred embodiment, a ferrule is press fit into a counterbore of the holder.

The foregoing and other objects and advantages of the invention will be apparent from the following description of a preferred embodiment thereof, taken in conjunction with the accompanying drawings.

Now, in order to acquaint those skilled in the art with the manner of making and using the present invention, there will be described, in conjunction with the accompanying drawings, a preferred embodiment thereof.

DETAILED DESCRIPTION OF THE INVENTION

Figure 1:
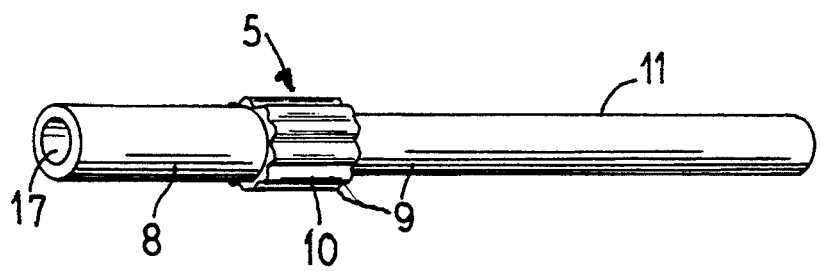
FIG. 1 is a perspective view of a holder including a ferrule.
Figure 2:
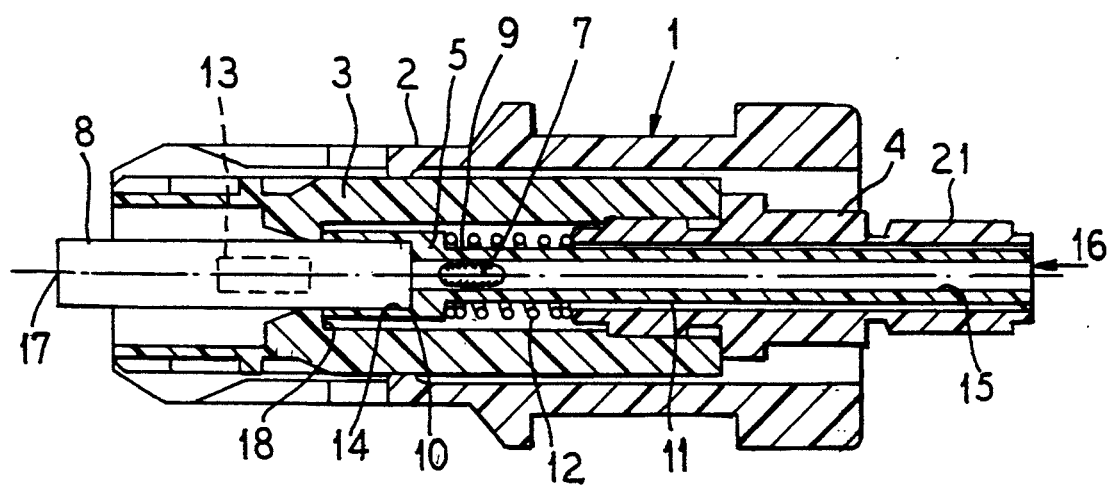
FIG. 2 is a longitudinal sectional view of a fiber optic connector in assembled form.
Figure 3:
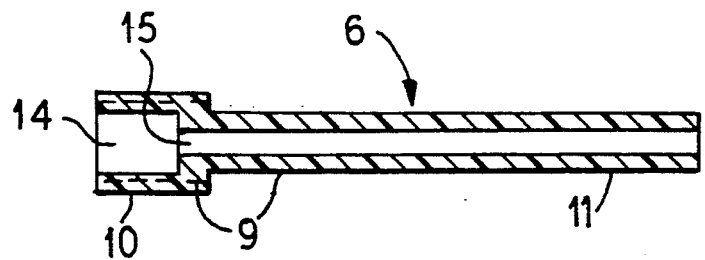
FIG. 3 is a longitudinal sectional view of a holder.

FIGS. 1-3 show a fiber optic connector 1 having an outer grip 2, a front shell 3 and a load bearing portion 4. Inserted into the front shell 3 is a holder assembly 5 which includes a ferrule 8 and a one-piece holder 6, having a continuous surface 9 which includes a collar 10 and a ferrule body 11 integral therein. The holder assembly 5 may be tuned to a concentric axis by a technician having aligned the connector assembly to a concentrically exact ferrule and moving the holder assembly 5 in and out of the front shell 3 and rotating the holder 6 to different selected rotational positions while out of shell and reinserting same while viewing an optical loss meter until the optimal (lowest loss) optical performance level is achieved.

The holder assembly 5 is held axially by a compression spring 12. The ferrule 8 is inserted into the bore 14 of the holder assembly 5, such as by press-fit, to close the front end of the inner circumferential bore 15 of the holder assembly 5. Adhesive 7 is injected from the back end of the holder assembly 5 (FIG. 2) from direction of arrow 16 and stopped from flowing by a rear portion of the ferrule 8 in the inner circumferential bore 15 by a syringe (not shown). A stripped fiber optic cable (not shown) is inserted from the rear end 16 through the inner circumferential bore 15 of the holder assembly 5 and through an orifice 17 of the ferrule 8.

The collar 10 and interior surface of the front shell 3 are multi-surfaced in order to allow tuning of the holder 6 and to prevent rotation of the holder assembly 5 upon insertion into the front shell 3. As shown in the preferred embodiment pictured here, the collar 10 includes twelve surfaces and positions for tuning. The exterior surface of the collar 10 abuts against a reciprocating interior front shell circumferential shoulder 18 (see FIGS. 6-7). FIGS. 1-3 and FIGS. 6-7 show the preferred embodiment of the collar 10 having a knurled profile. This embodiment allows up to twelve different rotational orientations. However, any multi-surfaced exterior portion is suitable which allows for precise concentric tuning.

The outer grip 2 includes a key 13 in order to allow the connector assembly to achieve a fixed and repeatable position upon insertion into a receptacle. The load bearing portion 4 is inserted into the outer grip 2 and the front shell 3 following insertion of the holder assembly 5. A strain relief ferrule (not shown) may be attached at position 21 and the load bearing portion 4 may be crimped at the position 21.

Figure 4:
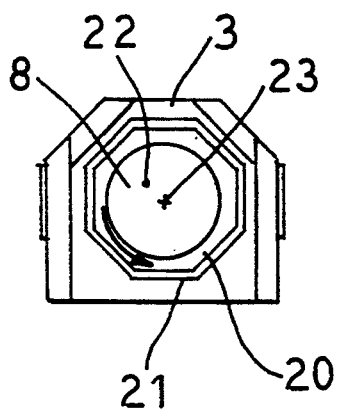
FIG. 4 is a transverse sectional view of a prior art connector prior to tuning.
Figure 5:
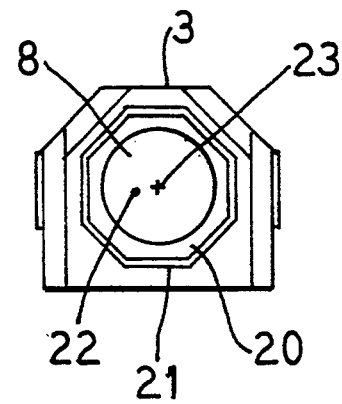
FIG. 5 is a transverse sectional view of a prior art connector subsequent to tuning.
Figure 6:
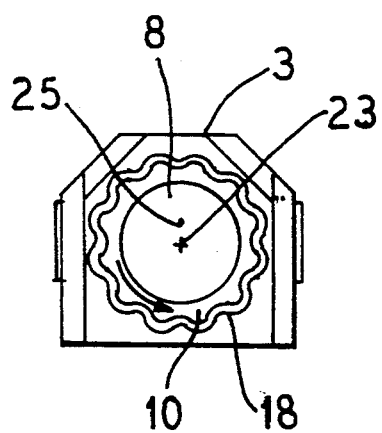
FIG. 6 is a transverse sectional view of the present invention prior to tuning.
Figure 7:
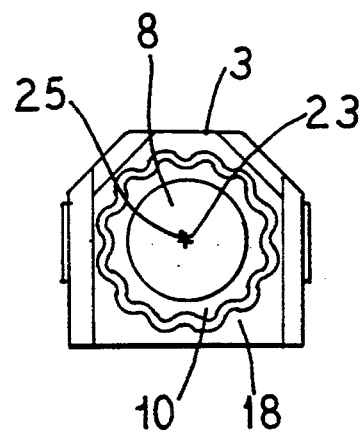
FIG. 7 is a transverse sectional view of the present invention subsequent to tuning.

FIGS. 4-5 shows a prior art embodiment of the front shell 3 having a holder with a hexagonal collar 20 and the reciprocal interior surface 21 of the front shell 3. The holder surrounds a ferrule 8. FIG. 4 shows the ferrule 8 having an eccentric orifice 22 off a concentric axis 23. The holder and the collar 20 are rotated counter-clockwise in order to attempt to tune the holder to align the orifice 22 with the concentric axis 23. However, the prior art embodiment, having a hexagonal configuration, does not allow precise tuning of the present invention. FIG. 5 shows the rotated holder and the still eccentric orifice 22. In FIG. 6, the present invention is shown having a twelve surfaced collar 10 and a reciprocal inner surface 18 of the front shell 3. In FIG. 6, an eccentric orifice 25 is shown in the ferrule 8, off the concentric axis 23. The holder is rotated counter-clockwise to tune the holder to the concentric axis 23. FIG. 7 shows the tuned holder with the orifice 25 at the concentric axis 23. The improvement over the prior art is evident in that the multi-surfaced holder and collar 10 of the present invention provides at least twice as many positions in which the holder may be more precisely tuned to the concentric axis 23 to provide high resolution of the optical fibers.

While what has been described constitutes a presently preferred embodiment, it should be recognized that the present invention may take other forms, for example, the fiber optic connector 1 may be other than the push-pull type of connector shown in FIG. 2. Further, the fiber optic connector 1 may be in other forms so long as it includes the holder assembly 5. It will thus be seen that the present invention provides a new and useful fiber optic connector, which has a number of advantageous characteristics, including those pointed out herein and others which are inherent from the invention. Preferred embodiments of the invention have been described, and it is anticipated that modifications may be made to the described form without departing from the spirit of the invention or the scope of the claims.

I claim:

1. A fiber optic connector for terminating a length of fiber optic cable having a front shell, a load bearing portion and a reciprocating holder inserted in said shell for holding a ferrule, an optical fiber, and said fiber optic cable, said holder comprising:
    a multi-surfaced exterior portion having at least twelve different adjacent positions which allows for tuning of said holder in multiple orientations of at least twelve positions to optimize concentric positioning of said holder with respect to a common mating axis, and
    a multi-surfaced interior of said front shell having a corresponding number of surfaces therein reciprocal to said multi-surfaced exterior portion.

2. The fiber optic connector of claim 1, wherein:
said multi-surfaced exterior portion includes twelve to thirty-two surfaces.

3. The fiber optic connector of claim 1, wherein:
said multi-surfaced exterior portion is located at the outer surface of a collar which surrounds the front of said holder.

4. The fiber optic connector of claim 1, wherein:
said collar is knurled.

5. The fiber optic connector of claim 1, wherein said holder is tuned relative to a keying position located on an outer grip.

6. The fiber optic connector of claim 1, wherein:
said holder includes:
said collar integral with the holder body.

7. The fiber optic connector of claim 6, wherein:
said holder includes:
a rear body extending sufficiently from the end of said front shell preventing adhesive from leaking into the body of said fiber optic connector.

8. The fiber optic connector of claim 7, wherein:
said holder includes:
a collar,
a body, and
rear body.

9. A fiber optic connector for terminating a length of fiber optic cable having a front shell, a load bearing portion and a reciprocating holder inserted in said front shell for holding a ferrule, an optical fiber and said fiber optic cable, said holder comprising:
    one-piece, integrally molded material having a collar, a body, and a rear body, said rear body is of a length whereby said rear body does not protrude from said load bearing portion following assembly with said front shell.

10. The fiber optic connector of claim 9, wherein:
said fiber optic cable inserted into said holder, said rear body of said holder having said fiber optic cable extending therethrough, said fiber optic connector being secured in said holder by adhesive, said rear body extending sufficiently from the end of said front shell preventing adhesive from leaking into said front shell of said fiber optic connector.

11. The fiber optic connector of claim 9 wherein said rear body does not require trimming in order to eliminate protrusion thereof from said load bearing portion.

12. The fiber optic connector of claim 9, wherein:
said holder and said front shell include a means for positioning said holder in multiple orientations of at least twelve positions to optimize concentric positioning of said holder with respect to a common mating axis and preventing rotation of said holder relative to said front shell.

13. The fiber optic connector of claim 9, wherein:
said holder includes a means for easy insertion into said front shell having: a multi-surfaced collar having at least twelve different adjacent positions and a reciprocal interior of
said front shell.

14. The fiber optic connector of claim 9, wherein:
said ferrule is press fit into a counterbore of the holder.

15. A fiber optic connector for terminating a length of fiber optic cable having a front shell, a load bearing portion and a reciprocating holder inserted in said front shell for holding a ferrule, an optical fiber and said fiber optic cable, said holder having a collar, a body and a rear body comprising:
    said collar and said body integral with said rear body wherein said collar, said body and said rear body are molded from an integrally molded material and further wherein said rear body extends sufficiently from said front shell to provide a rigid gripping surface sufficient for tuning said holder within said front shell.

16. The fiber optic connector of claim 15, wherein:
said rear body of said holder receiving said optical fiber which is adhesively secured to the holder and said ferrule, said rear body extending sufficiently from the end of said front shell whereby adhesive is prevented from leaking into said front shell of said fiber optic connector.

17. The fiber optic connector of claim 15, wherein:
said holder and said front shell include a means for positioning said holder in multiple orientations having at least twelve positions to optimize concentric positioning of said holder with respect to a common mating axis and preventing rotation of said holder relative to said front shell.

18. A holder and a ferrule for a fiber optic connector for terminating a length of fiber optic cable having at least one optical fiber and a load bearing portion attached to a front shell, said fiber optic cable attached to said holder, said holder and said fiber optic cable being reciprocable within said front shell and said load bearing portion, said holder having a collar, a body and a rear body, said rear body extending sufficiently from said front shell to provide a rigid gripping surface sufficient for tuning said holder within said front shell.

19. The fiber optic connector of claim 18, wherein:
said fiber optic cable includes at least one optical fiber, a buffer, strength members, and an outer jacket, said fiber optic cable being stripped of said strength members and said outer jacket at a termination point, said optical cable then being inserted into said connector, said stripped fiber optic cable being inserted through the rear body and said body and into said ferrule, said stripped fiber optic cable being adhesively attached inside said holder, said adhesive being retained by said holder and said rear body to prevent adhesive from leaking into said shell of said fiber optic connector.

20. The fiber optic connector of claim 18, wherein:
said fiber optic cable includes at least one optical fiber, a buffer, strength members, and an outer jacket, said fiber optic cable being stripped of said strength members and said outer jacket at a termination point, said optical cable then being inserted into said holder and being adhesively attached inside said holder, said holder then allowing positioning of said holder via a multi-surfaced exterior inside said shell in an orientation of high resolution.

* * * * *